Figure 1:
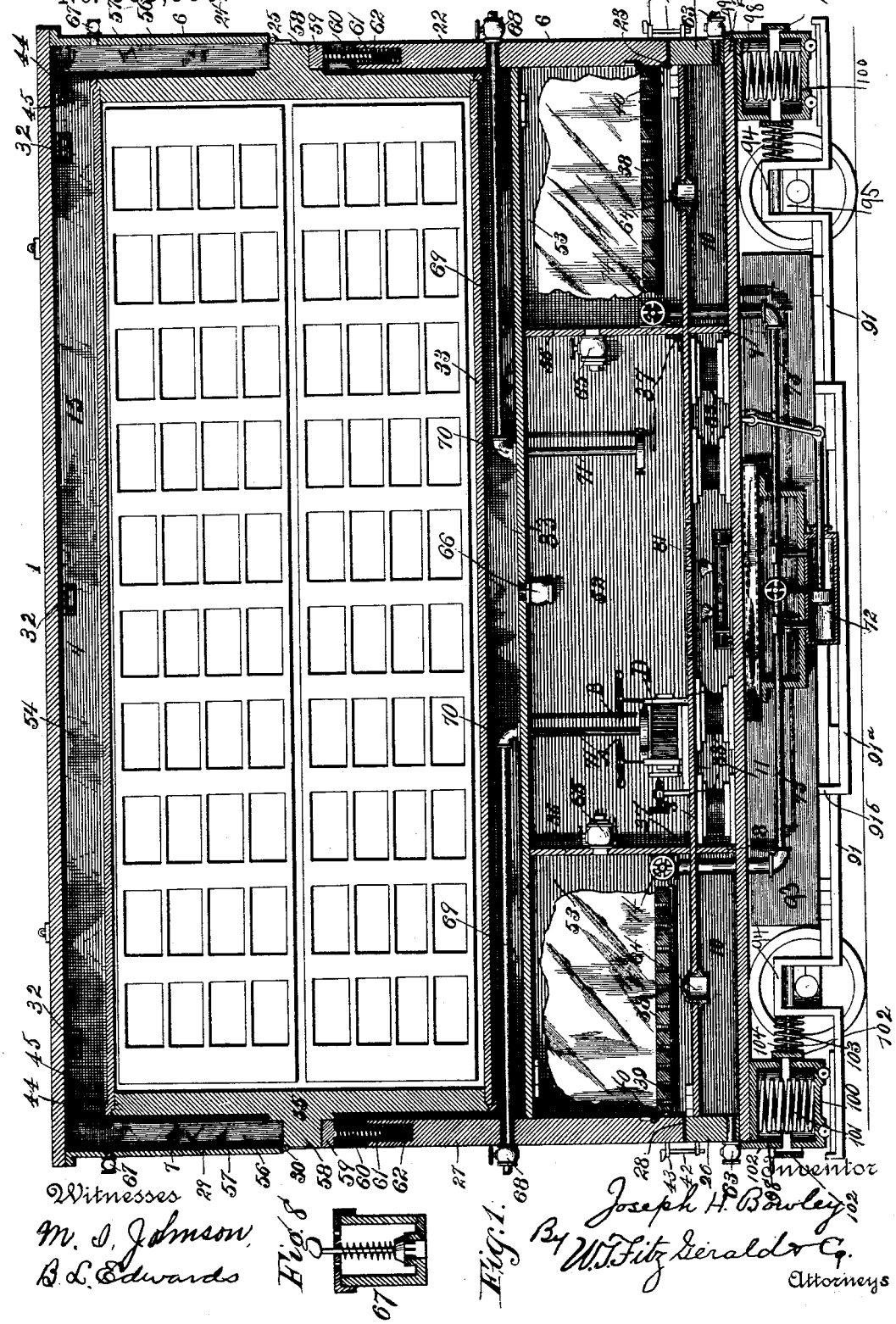

(No Model.) 4 Sheets—Sheet 1.

J. H. BOWLEY.
REFRIGERATOR FOR STORING AND TRANSPORTING EGGS, MEATS, FRUITS, AND OTHER PERISHABLE FOOD SUPPLIES.

No. 593,509. Patented Nov. 9, 1897.

Witnesses
M. I. Johnson
B. L. Edwards

Inventor
Joseph H. Bowley
By W. T. Fitz Gerald & Co.
Attorneys (No Model.) 4 Sheets—Sheet 2.
J. H. BOWLEY.
REFRIGERATOR FOR STORING AND TRANSPORTING EGGS, MEATS, FRUITS, AND OTHER PERISHABLE FOOD SUPPLIES.

No. 593,509. Patented Nov. 9, 1897.

Witnesses
M. J. Johnson,
B. L. Edwards

Joseph H. Bowley
Inventor
By W. T. Fitzgerald & Co.,
Attorneys

THE NORRIS PETERS CO., PHOTO-LITHO., WASHINGTON, D. C.

(No Model.) 4 Sheets—Sheet 3.
J. H. BOWLEY.
REFRIGERATOR FOR STORING AND TRANSPORTING EGGS, MEATS, FRUITS, AND OTHER PERISHABLE FOOD SUPPLIES.
No. 593,509. Patented Nov. 9, 1897.
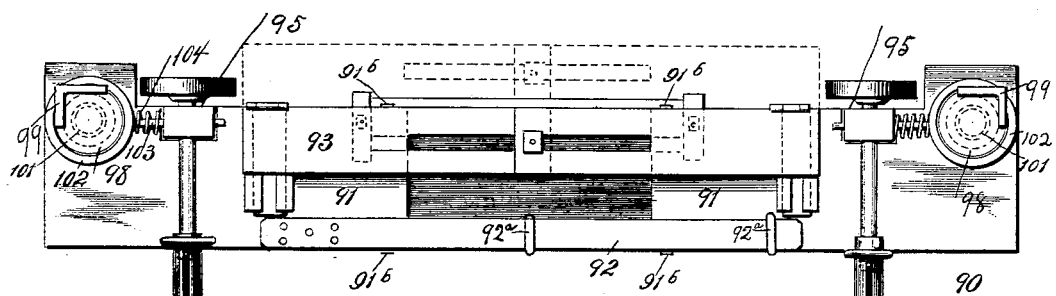
Fig. 3
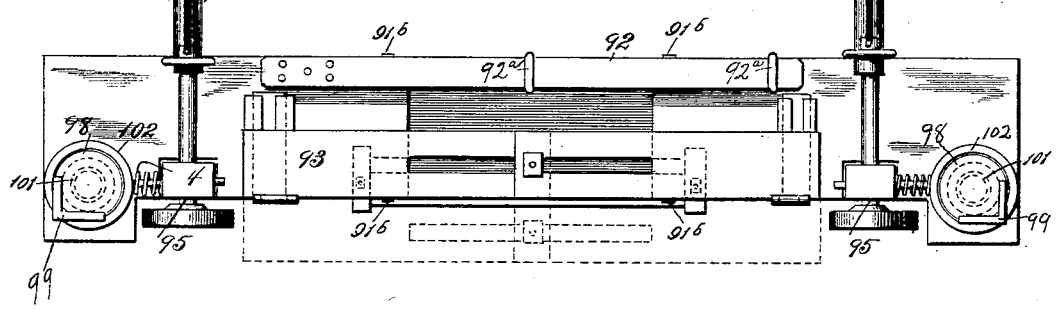
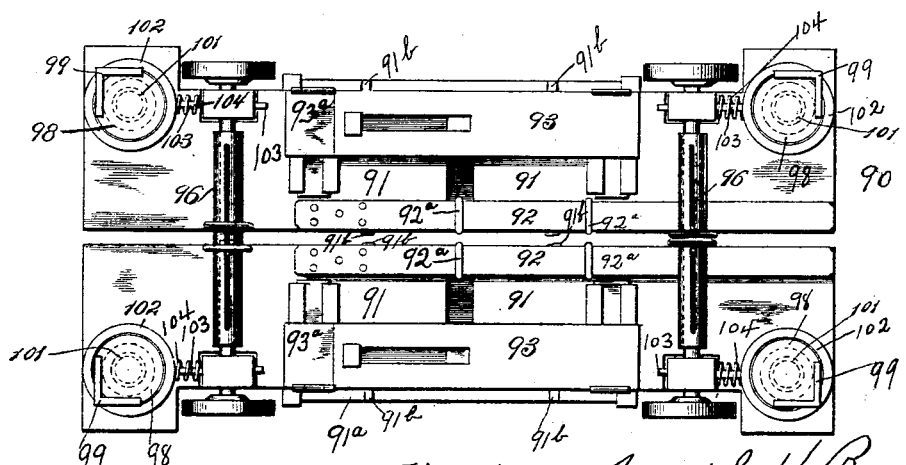
Fig. 4
Joseph H. Bowley
Inventor
By J. W. T. Fitz Gerald & Co.
Attorneys
Witnesses
M. J. Johnson.
A. K. Williams.

(No Model.)  4 Sheets—Sheet 4.
J. H. BOWLEY.
REFRIGERATOR FOR STORING AND TRANSPORTING EGGS, MEATS, FRUITS, AND OTHER PERISHABLE FOOD SUPPLIES.
No. 593,509. Patented Nov. 9, 1897.
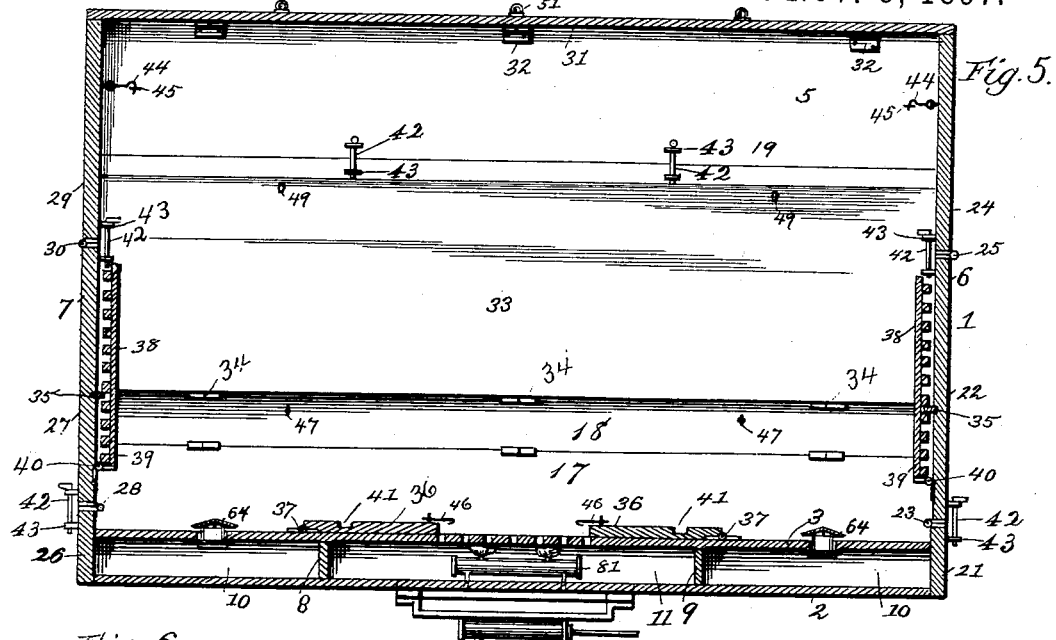
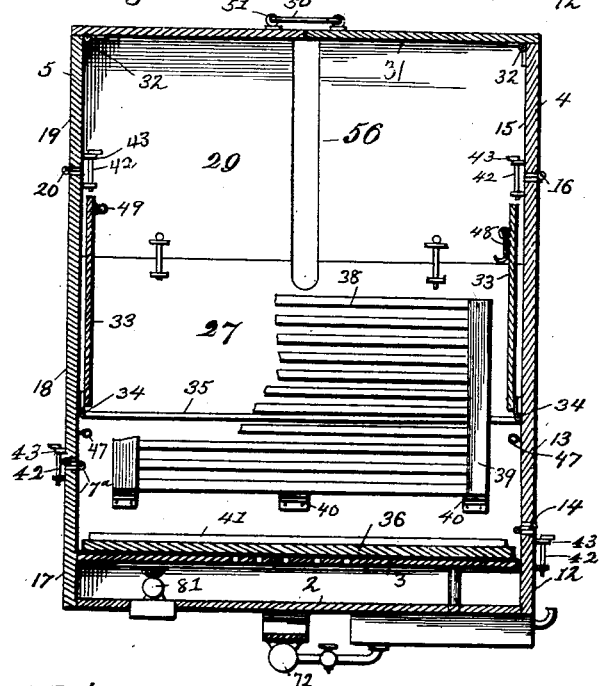
Witnesses:
M. J. Johnson.
B. L. Edwards
Joseph H. Bowley
Inventor
By W. T. FitzGerald & Co.
Attorneys

UNITED STATES PATENT OFFICE.

JOSEPH HENRY BOWLEY, OF MARENGO, ILLINOIS, ASSIGNOR OF ONE-HALF TO JOHN W. STOCKWELL, OF SAME PLACE.

REFRIGERATOR FOR STORING AND TRANSPORTING EGGS, MEATS, FRUITS, AND OTHER PERISHABLE FOOD SUPPLIES.

SPECIFICATION forming part of Letters Patent No. 593,509, dated November 9, 1897.

Application filed August 17, 1895. Serial No. 559,688. (No model.)

*To all whom it may concern:*

Be it known that I, JOSEPH HENRY BOWLEY, a citizen of the United States, residing at Marengo, in the county of McHenry and State of Illinois, have invented certain new and useful Improvements in Refrigerators for Storing and Transporting Eggs, Meats, Fruits, and other Perishable Food Supplies, of which the following is a specification.

As is well known to those engaged in shipping perishable food products—such as meats, poultry, delicate vegetables, fruits, and eggs—by railways and otherwise, the shipper is compelled under present conditions and especially when the products are shipped a great distance to calculate upon a certain percentage of total loss and that part will be damaged to such an extent as to bring but a comparatively small price. Such damage of the products mentioned is the effect of several causes, chief among which is an inferior mode of packing, rough handling incident to the cartage, and the loading of the products on and the unloading of the same from railway-cars and other carriers, the jolting of the cars in transit, changes in temperature, the fact that the products are allowed to remain in one position during the entire journey, and that proper ventilation is not provided.

A preservative atmosphere in some cases and a low temperature in others is absolutely essential to the preservation of certain products in a wholesome state during a long journey or long intervals of storage. This is particularly true of delicate ripe fruits—such as grapes, peaches, &c.—which are very susceptible to damage and which when allowed to remain in one position during a long journey will be found in a soft or "mushy" condition at the bottom, due to the fact that the weight of the fruit is always imposed upon the lower portion thereof and such portion is shut off from ventilation. This is equally true in a greater degree with reference to eggs, which are liable to be seriously damaged by sudden changes as well as extremes of temperature, violent agitation, and breakage, and also by being permitted to remain too long in one position.

It is well known that when eggs are allowed to remain too long in one position the yolks by the laws of specific gravity rise to the upper ends of the shells and form that inferior grade known to the trade as "black ends," which is due to the fact that the yolk adheres to the fibrous lining of the shell, and when the eggs are shaken or moved after such adherence has taken place the yolks are liable to break and commingle with the whites, rendering the eggs cloudy in appearance and open to suspicion when tested, greatly lessening their market value. It is also well known to shippers of perishable food supplies that while specially-constructed cases are necessary to the delivery of such products at their destination in anything like a marketable condition the express and freight charges for the return of such cases to the shipper form a very important item and materially reduce the net profits of the shipper, if not entirely absorbing same. It will be understood that, while my invention is especially applicable to the safe conveyance of food supplies while in transit from one point to another, yet it is equally efficient when applied in a stationary or fixed manner for use in storage-warehouses and the like.

With these things in view my invention has for its general object the provision of a shipping and storage case which while designed more especially for the shipment and storage of eggs and delicate fruits and vegetables may be used to advantage for shipping and storing perishable meats, poultry, and similar food supplies and is adapted to be easily folded in a small compass, thus enabling it to be easily moved from place to place and loaded upon and unloaded from trucks, cars, and other carriers, and, further, it is so constructed as to absorb all vibrations resulting from any usual form of concussion and prevent the transmission of the same to its contents. It holds the products in such a manner that the position of each component part thereof may be simultaneously and easily changed, thereby preventing deterioration of the same. It is so constructed that after being discharged of its contents it may be so compactly folded as to occupy the minimum amount of space, and which embodies means for maintaining a thorough ventilation of its contents by an effective circulation of air, artificial or natural, preserving a uniform temperature in its interior and among its contents, means for positively controlling the temperature by maintaining it at any predetermined point, which is effected by refrigerating-chambers for lowering and a heating-compartment for raising the temperature and an intermediate chamber for commingling and proportioning the high and low temperatures and for generating and disseminating ozone in its interior and among its contents, and means for generating a preservative atmosphere under heavy pressure charged with some suitable antiseptic and disseminating the same throughout its interior and permeating every cell and fiber of the commodity contained.

To the attainment of the foregoing ends, the invention consists in certain peculiar processes for preserving perishable food supplies and in the peculiar and advantageous construction of apparatus, certain novel combinations, and the adaptation of parts hereinafter described, and particularly pointed out in the claims appended.

Figure 2:
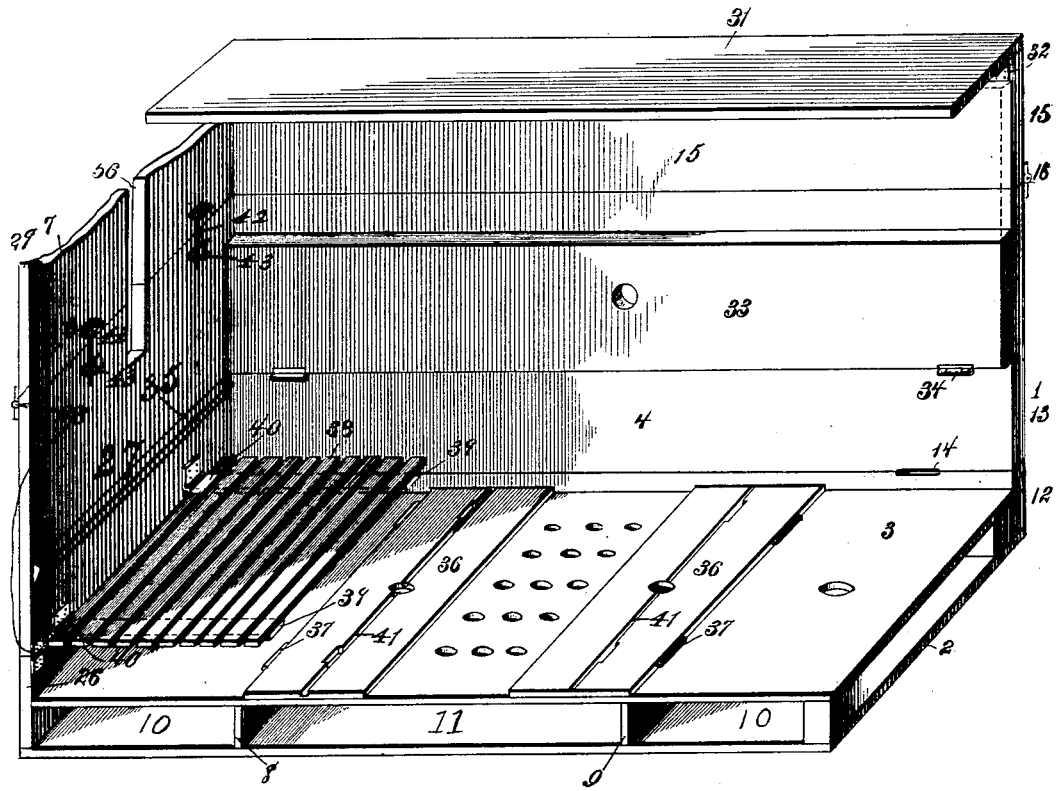
Figure 10:
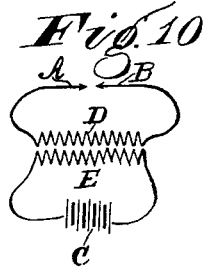

In the accompanying drawings, forming part of this specification, Figure 1 is a longitudinal vertical section of a shipping and storing case embodying my invention. Fig. 2 is a perspective view, on a reduced scale, of the body of the case with certain parts removed and other parts broken away. Fig. 3 is a top plan view of the truck in an extended condition. Fig. 4 is a top plan view of the truck in a folded condition. Fig. 5 is a longitudinal vertical section of the body of the case as it appears when ready to be folded and returned in compact form to the owner. Fig. 6 is a vertical transverse section of the same. Fig. 7 is a detail view of one of the electrical heaters. Fig. 8 is a longitudinal section of a preferred form of pressure-regulated valve employed. Fig. 9 is a detail of the pump. Fig. 10 is a diagrammatic view showing utilization of separated electrodes for communication with the storage-chamber.

For convenience of description I will set forth my improved process for preserving perishable food products in conjunction with the apparatus shown in the drawings, in which similar numerals designate corresponding parts in all the several views.

The foldable body 1 of my improved shipping and storage case is preferably constructed of wood, although it may be made of any other suitable material, and it has a bottom 2 and a false bottom 3, arranged about the proportional distance illustrated above the bottom 2 and fixedly connected therewith by the side walls 4 5 and the end walls 6 7, hereinafter to be described. The space between the side and end walls and the bottoms 2 and 3 is divided by the transverse fixed partition-walls 8 and 9 into the end chambers 10 and the larger intermediate chamber 11, as illustrated in Figs. 1, 2, 5, and 6. The side wall 4 of the body comprises the fixed section 12, the section 13, which is connected by double-acting or compound hinges 14 with the section 12 and is designed to fold inwardly, and the section 15, which is connected to the upper edge of section 13 by hinges 16 in such a manner as to adapt it to be folded back upon the outside of section 13 when said section 13 is folded inwardly. The opposite side wall 5 has a lower stationary section 17 of slightly greater height than the stationary section 12 of wall 4, an intermediate section 18, which is connected in a hinged manner by the compound hinge 17ᵃ to the section 17 and is designed to fold in upon the wall 4 after the same has been folded inwardly, and the upper section 19, which is connected to the upper edge of section 18 by hinges 20 in such manner as to permit it to fold back upon the outer side of the wall 18. The end wall 6, which is designed to be folded inwardly before the wall 4, has the lower stationary section 21 of slightly less height than the stationary section 12 of wall 4, the intermediate section 22, connected by hinges 23 to section 21, and the upper section 24, connected by hinges 25 with the section 22 in such manner as to permit it to be folded back against the outside of section 22. The end wall 7, which is the first to be folded in, has a stationary section 26 of the same height as the stationary section 21 of the other end wall, and it also has the intermediate section 27, connected by hinges 28 to section 26, and an upper section 29, connected by hinges 30 with the section 27 in such manner as to permit of it being folded back upon the outside of said section 27. When the several walls 4, 5, 6, and 7 are in their upright operative positions, the end walls 6 and 7 rest between the side walls 4 5, and therefore the top walls 31 are connected by hinges 32 to the sections 15 19 of the side walls, (see Fig. 6,) so as to rest upon the upper edges of the end walls.

33 indicates foldable partition-walls. (See Figs. 1, 2, 5, and 6.) These walls are connected by hinges 34 to the side walls 4 5 and are designed to fold up against said walls and are also designed when lowered to their operative horizontal position to rest upon ledges 35 on the inner sides of the end walls 6 and 7, as shown.

36 indicates transverse partition-walls which are connected by hinges 37 to the false bottom 3, and when in their upright position assist in supporting the walls 33.

38 indicates slat ice-supports which are mounted on the long wings 39 of hinges 40, which are connected to the end walls 6 7, so as to permit of the supports being folded up against said end walls, as illustrated in Fig. 6. When down in their operative horizontal position, the supports 38 rest upon ledges 41 on the partition-walls 36.

The sections of the sectional side and end walls are held against casual flexing by the removable stays 42, which take through strap loops 43 on the wall-sections, as shown, and the end walls 6 7 are detachably connected to the side walls 4 5 by the hooks and eyes 44 45, the former being connected to the end walls and the latter to the side walls, as shown. The partition-walls 36 are also provided with hooks 46 to engage eyes 47 on the side walls 4 5, so as to hold said partition-walls in their upright position, and the partition-walls 33 are connected in their operative horizontal position by hooks and eyes 48 49. The top walls 31 are also secured in their operative position by the hooks and eyes 50 51. The stays 42 and the straps 43 and the several hooks and eyes described form convenient means for securing the several parts of my improved foldable body 1 in their operative positions. I do not desire, however, to be understood as confining myself to such means, as any other means suitable to the purpose may be employed.

When all the several parts of the body 1, as described, are in their operative position and it is desired to fold the same, the several stays 42 are removed from the straps 43 and the upper sections of the end walls 6 7 are disconnected from the side walls and swung back upon their hinges and down against the intermediate sections. The top walls 31 are then disconnected and swung down against the inner sides of the upper sections 15 19 of the side walls, and the said sections 15 19 may then be swung out and down against the outside of the intermediate sections of the side walls. This permits the operator to gain access to the interior and disconnect the partition-walls 33 and raise them against the side walls, and when he has done this he can disconnect the partition-walls 36 from the side walls and fold said walls 36 down upon the false bottom 3. The slat-supports 38 can then be easily raised against the end walls, after which the end and side walls can be folded down upon the bottom 3 in the following order—viz., the end wall 7 first, the end wall 6 second, the side wall 4 third, and the side wall 5 fourth and last. The walls 4, 5, 6, and 7 may be as readily unfolded, set up, and secured in their operative positions when it is desired to use the body.

The side walls 4 and 5 are so hinged, by means of the double-acting or compound hinges 14 and 17ª, that they may be swung out as well as in with respect to the bottom 3, and therefore it will be seen that they will not interfere with the inward movement of the end walls, as they may be swung out prior to such inward movement of said walls.

The body 1, it will be seen from the foregoing, can be readily folded into a small compass and in this condition returned to its owner. In consequence of this it will be appreciated that a much larger number of the case-bodies can be loaded upon a car than if they were permitted to remain in the unfolded condition shown and a material saving in the cost of shipment effected—a valuable desideratum.

When unfolded and ready for use, the body 1, as better shown in Fig. 1, has the chambers 10 11, before described, the chamber 52, which is connected with chamber 11 by the apertures in the false bottom 3, the refrigerating-chambers 53 at opposite ends of the chamber 52, and the large upper storage-chamber 54. In this chamber 54 the goods to be transported or stored may be packed in any suitable manner. I prefer, however, to arrange in said chamber 54 a rotatable holder 55, such as is disclosed in my Letters Patent No. 496,184 and bearing date of April 25, 1893, in which eggs, fruit, and other produce may be packed in layers or in cell-cases, as were fully pointed out in the specification of my said patent.

Vertical grooves 56 are formed in the end walls 6 7 by slotting said walls and providing them upon their outer sides with strips 57, formed in sections in conformity to the sections of the walls. In these grooves 56 are arranged the trunnions 58 of the holder 55, which are mounted and bear on shoes 59, which are arranged and adapted to move in the slots. Said shoes 59 have depending stems 60, which are received in sockets 61 in the end walls and are surrounded by springs 62, interposed between the shoes 59 and the bottoms of the sockets, whereby it will be seen that they will cushion the shoes 59 and also the holder 55, so as to prevent damage of the contents of said holder arising from vertical agitation. The construction illustrated and described also permits of the holder 55 being readily rotated or partially rotated manually or automatically at predetermined intervals through the medium of any suitable mechanism, so as to simultaneously change the position of the contents thereof. This rotation or partial rotation will, if eggs are contained in the holder, prevent the formation of black ends, and when fruit is the subject treated will prevent the formation of soft or mushy spots, which are caused by the fruit remaining in one position for a long time, resulting from the upper portion of the contents resting upon the lower portion. The holder 55 also forms a desirable adjunct or part of my improved shipping and storage case, for the reason that it holds the eggs, fruit, or other produce in such a manner as to permit free and thorough ventilation of the same. This is fully described in my aforesaid Letters Patent and need not be referred to in detail here.

63 indicates detachable check-valves having threaded portions inserted in threaded apertures in the end walls 6 and 7 of the body and are so constructed as to permit outside air to pass into the chambers 10 and check its return therefrom.

64 indicates detachable tubes which are arranged in the floor 3 to connect the chambers 10 and the refrigerating-chambers 53 and are provided with caps, as shown, to prevent ice-drippings from entering the chambers 10.

65 indicates detachable check-valves which have threaded portions inserted in threaded apertures in the partition-walls 36 and are so constructed as to permit air to pass from chambers 53 into chamber 52 and check its return.

66 indicates a detachable check-valve which has a threaded portion inserted in a threaded aperture in one of the walls 33 and is designed to permit air to pass from chamber 52 to the storage-chamber 54 and check its return, and 67 indicates combined stop-cocks and check-valves, which have threaded portions inserted in threaded apertures in the end walls 6 and 7 and are so constructed that when their stop-cocks are open they will permit air to pass out from the chamber 54, but will check the entry of air.

When ice is placed in the chambers 53 and the cocks of valves 63 and 67 are open, it will be seen that air will pass from the outside through the valves 63, the chambers 10, the tubes 64, the chambers 53, the valves 65, the chamber 52, the valve 66, the chamber 54, and out through the valves 67. This constant circulation of air will thoroughly ventilate the products in the holder 55, and the air being cooled in its passage through the chamber 53 will arrest and prevent deterioration of the products even in the warmest weather. If such cooling of the air en route through the chambers 53 renders the temperature in the chamber 54 too low at any time, the temperature may be raised by closing the cocks of valves 63 and opening the cocks of valves 68 on the pipes 69, which are detachably connected by elbows 70 to pipes 71, opening into the chamber 52. When the stop-cocks of valves 63 are closed and the stop-cocks of valves 68 are opened, as stated, air will pass from the outside of case through pipes 69 and 70 directly into the chamber 52 and from thence into the chamber 54 to displace the cold air in the latter.

The valves 63, 65, 66, and 67, the tubes 64, and the pipes 69 and 70 are detachably connected to the body, as described, in order that they may be readily removed therefrom when the body is to be folded, as before described.

It is desirable in some cases to maintain a certain pressure of air in the storage-chamber 54, and to this end I provide the air-compressing pump 72, which is connected with the bottom of the body 1 and is illustrated in detail in Fig. 11. This pump, which may be of the construction shown or any other suitable construction, may be operated manually or by any suitable motive power. The said pump 72 has two pipes 73 connected to its cylinder, and these pipes lead to two-way valves 74, of the usual or any preferred construction, which in one position connect the pipes with the refrigerating-chamber 53 and in another position directly with the chamber 52. Thus the air may be caused to pass through the chambers 53 and be cooled before entering chamber 52, or may be discharged direct into said chamber 52 without being cooled. When a certain pressure of air is to be maintained in the storage-chamber 54, suitable pressure-regulated valves of the usual construction (not illustrated) are detachably connected with said chamber 54 in lieu of the check-valves 67, so as to permit the escape of air therefrom when the pressure is in excess of what is desirable. The object of using compressed air is to more effectively cause the antiseptic properties imparted thereto to enter the interstices between the various particles of food and thus more reliably accomplish the desired result. In the absence of pressure the air supplied to the chamber would affect only the outer surface of the food to be preserved, but the same air under pressure would penetrate or enter throughout the particles of the entire mass.

It is also important in some cases, in order to prevent deterioration of the perishable products in chamber 54, to disseminate ozone in said chamber. This may be accomplished in a well-known manner and it is not deemed necessary to refer thereto in detail. The generation of ozone and its dissemination by the medium of compressed air conveyed to the storage-chamber 54 assist very materially in preventing the deterioration of all kinds of perishable products, as every cell and tissue thereof is reached in virtue of the pressure maintained.

In Fig. 10 I have illustrated a diagrammatic view of means for generating ozone, wherein separated electrodes A and B and induction-coils D and E are shown to be in communication with the battery C.

77 indicates a chamber arranged beneath a bottom 2, connected by suitable apertures with the chamber 52 and also with the pump 72.

The preservative gas formed in the chamber 77 may be let into the chamber 52, and in consequence into the chamber 54, through valved pipe 66 at certain desired intervals, and when used in conjunction with the compressed air, or preferably with compressed air and ozone, or alone, it positively lessens the liability of the contents of the case becoming deteriorated and arrests decay.

It is also necessary in some cases to maintain a heat in the interior of the case. This may be done by the burners 81, fed from the tank 82 below the bottom wall 3, but is preferably effected by the electrical resistance-coils 83, situated between the floors 2 and 3. These coils, one of which is shown in detail in Fig. 7, are properly connected with the battery, located at any preferred point.

It is believed that my improved shipping and storage case when properly operated will prevent even the slightest deterioration of or injury to the perishable products which it contains, and it will be appreciated that the case may be easily operated and controlled and that the cost of its proper maintenance is small in view of the results I claim to produce.

To facilitate moving the case from place to place, as well as loading the same on and unloading it from trucks and railway-cars, I provide the truck 90, (shown in Figs. 1, 3, and 4,) which is designed when the case is to be shipped back to the owner to be reduced in size, so as to lessen the freight costs. The truck 90 comprises the frame-pieces 91, adjustably connected by ribs 92, adjustably secured in position by the staples 92ᵃ, so as to permit the inner ends of the frame-pieces 91 to be brought close to each other, as illustrated in Fig. 10, to reduce the length of the truck. The hinged side pieces consist of two overlapping sections 93ᵃ and 93, adjustably connected together to permit of the length of the truck being reduced, and are designed to be swung up, as shown in Fig. 1, to hide the mechanism beneath the case-body 1. Said truck further consists of the end sections 94, which are practically a continuation of the frame-pieces 91, the axle-boxes 95, mounted in the end sections 94, and the telescopic axles having the sleeve 96, adapted to receive the ends of the axles as the width of the truck is decreased. The buffers or spring-cushions consist of the upper section 98, having the angle-iron 99 to conform to the case-body 1, the lower section 100, which is mounted on rollers bearing on the frame-sections 94, the spring 101, interposed between the sections 98 and 100, and the annulus 102, which surrounds the sections 98 and 100 and has the stem 103 and the coiled spring 104 surrounding said stem and interposed between the annulus and the frame-sections, as shown. The body 1 being mounted on the upper sections 98 of the buffers, it will be observed that said body is thoroughly cushioned by the springs 101 and that all longitudinal and lateral concussion and strain are taken up by the springs 104, and consequently jolting and shaking of the body 1 are effectually prevented. The reinforcing sections or plates 91ᵃ rest under and support the ends of the frame-pieces 91 and are held in their operative position by the straps 91ᵇ, which reach partly over the ends of the frame-pieces 91 from each side thereof, extending loosely under the ribs 92 and the hinged side pieces 93 and 93ᵃ.

It will be understood that cases or compartments embodying my improvements may be built in cars and warehouses, so as to form permanent parts of the same, in which case, as is obvious, the trucks and the foldable walls will be dispensed with and rigid fixedly-connected walls employed.

The trucks 90 are designed more especially for use in conjunction with my improved case, but they may be used to advantage for moving pianos, safes, and other heavy articles, and indeed may be put to all the uses required of an ordinary truck.

Having thus fully set forth and described my invention, what I claim as new, and desire to secure by Letters Patent therefor, is—

1. In a shipping and storage case, a foldable body comprising a bottom, side and end walls connected in a hinged manner with the bottom so as to enable them to fold inwardly upon the same and having flexibly-connected sections, top sections flexibly connected to the upper sections of the side walls and adapted to rest upon the end walls, the transverse partition-walls connected in a hinged manner with the bottom, and the longitudinal partition-walls connected in a hinged manner with the side walls, and adapted to rest on the transverse partition-walls; the said foldable walls, when properly connected, being adapted to form a plurality of air-tight chambers in the body, substantially as and for the purpose specified.

2. In a shipping and storage case, a foldable body comprising a bottom, end walls having lower sections fixedly connected to the bottom, upper sections flexibly connected together and to the lower fixed sections and means for normally holding said sections against flexing; the lower fixed section of one end wall being of a greater height than the corresponding section of the other end wall, side walls having lower sections of greater height than the corresponding sections of the end walls, upper sections flexibly connected together and to the lower fixed sections, and means for normally holding said sections against flexing; the lower fixed section of one side wall being of a greater height than the corresponding section of the other side wall, top walls flexibly connected to the upper sections of the side walls and adapted to rest upon the end walls, the transverse partition-walls connected in a hinged manner with the bottom and the longitudinal partition-walls connected in a hinged manner with the side walls and adapted to rest on the transverse partition-walls; the said foldable walls, when properly connected, being adapted to form a plurality of chambers in the body, substantially as described and for the purpose set forth.

3. A shipping and storing case for perishable food products having a chamber for the reception of such products, the combination therewith of an outwardly-opening check-valve controlling communication between said chamber and the outer air, a refrigerating-chamber, an inwardly-opening check-valve connecting said chamber with the outer air, and a check-valve intermediate the refrigerating-chamber and the storage-chamber adapted to permit air to pass from the former to the latter and check its return, substantially as described and for the purpose set forth.

4. A shipping and storing case for perishable food products having a chamber for the reception of such products, the combination therewith of an outwardly-opening, pressure-regulated, check-valve controlling communication between said chamber and the outer air, a refrigerating-chamber, a check-valve intermediate of the refrigerating-chamber and the storage-chamber adapted to permit air to pass from the former to the latter and check its return, an air-compressing pump and a connection between said pump and the refrigerating-chamber, substantially as specified.

5. A shipping and storing case having a storage-chamber, and separated electrodes arranged in communication with said storage-chamber; the said electrodes being connected to conductors adapted to be electrically connected with an electric machine, substantially as and for the purpose set forth.

6. In a shipping and storage case, the combination of the body and the truck having buffers arranged beneath the body and respectively comprising the upper section, the lower section arranged on rollers on the truck-frame, a coiled spring interposed between said upper and lower sections, an annulus surrounding the sections and having a stem inserted in the truck-frame, and a spring surrounding the stem and interposed between the annulus and truck-frame, substantially as and for the purpose set forth.

7. A truck comprising frame-sections adjustably connected together and adapted to be moved toward each other to reduce the length of the truck and telescopic axles carrying wheels and connected with and supporting the frame-sections whereby the truck may be reduced in width, substantially as specified.

In testimony that I claim the foregoing as my invention I have signed my name in the presence of two subscribing witnesses.

JOSEPH HENRY BOWLEY.

Witnesses:
C. P. FILLMORE,
ED. KEWLEY.